A. HOBSON.
COMBINED STALK CUTTER AND SOIL PULVERIZER.
APPLICATION FILED APR. 9, 1920.
1,377,073.
Patented May 3, 1921.
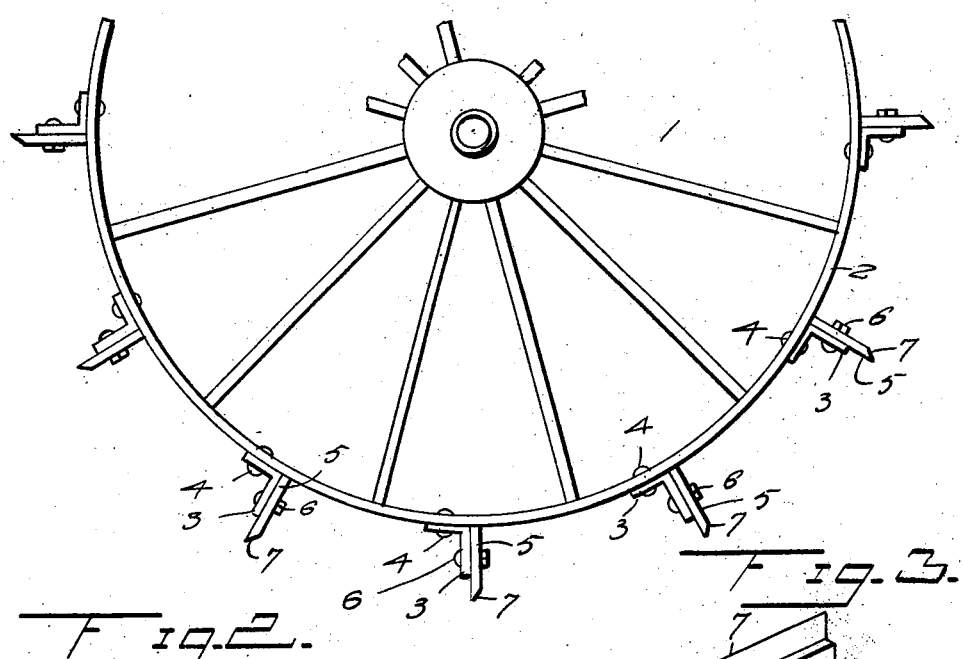
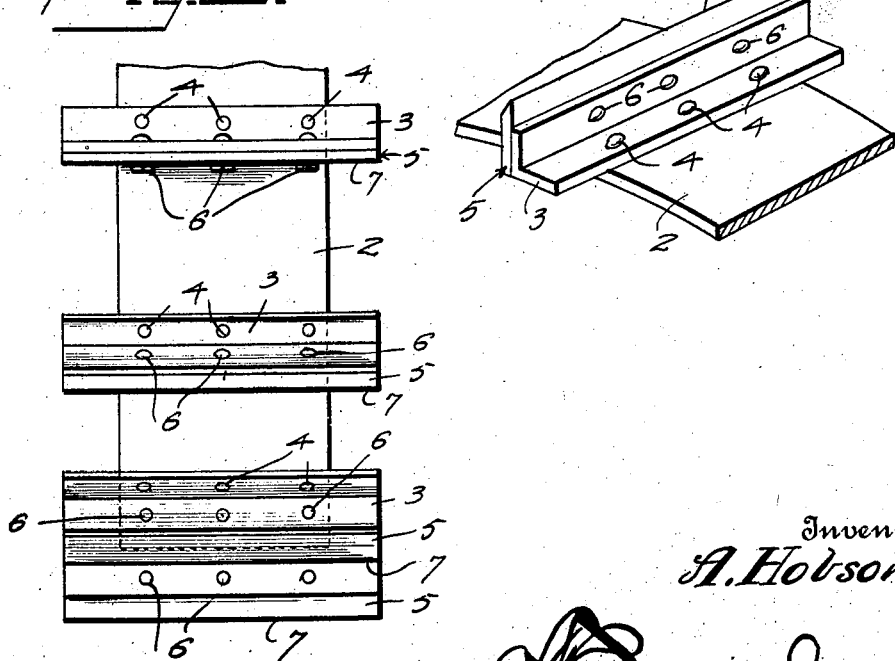
Inventor
A. Hobson

UNITED STATES PATENT OFFICE.

AMON HOBSON, OF GLENDALE, ARIZONA.

COMBINED STALK-CUTTER AND SOIL-PULVERIZER.

1,377,073.            Specification of Letters Patent.      Patented May 3, 1921.

Application filed April 9, 1920. Serial No. 372,626.

*To all whom it may concern:*

Be it known that I, AMON HOBSON, a citizen of the United States, residing at Glendale, in the county of Maricopa and State of Arizona, have invented certain new and useful Improvements in Combined Stalk-Cutters and Soil-Pulverizers; and I do hereby declare the following to be a full, clear, and exact description of the invention, such as will enable others skilled in the art to which it appertains to make and use the same.

This invention relates to combined stalk cutters and soil pulverizers adapted to be used upon motor driven tractors or other vehicles having relatively broad wheel treads and it consists in the novel features hereinafter described and claimed.

An object of the invention is to provide a combined stalk cutter and soil pulverizer of simple and durable structure and in the form of an attachment adapted to be applied to the wheel of a tractor and which may serve in the capacities stated at the same time that the tractor is employed for drawing harrows or other soil working tools or machines over the same.

With this object in view the combined stalk cutter and soil pulverizer includes a series of angle irons adapted to be applied to the periphery of the tractor wheel, said wheel having a broad tread. The angle irons are disposed transversely across the tread of the wheel and their cutting blades are detachably mounted upon the outstanding portions of the angle irons when the irons are in position upon the wheel. It is obvious that the wheels at the opposite sides of the tractor may be equipped with the combined stalk cutters and soil pulverizers whereby the tractor may operate upon two rows of stalks simultaneously.

In operation the wheels engage the standing stalks and break them down and as the blade comes in contact with the prostrate stalks they are severed into sections or cut, and the same time the blades enter the soil, break up the clods and then cut incisions in the soil whereby the soil is readily pulverized as the broad tread of the wheel to which the attachment is applied comes in contact with the same and the weight of the tractor machine is applied to the broken clods and to the soil about the incisions.

In the accompanying drawing:—

Figure 1 is a side elevation of a tractor wheel with the stalk cutter and soil pulverizer applied.

Fig. 2 is a front elevation of the same.

Fig. 3 is a detail view of the features of the invention.

As illustrated in the accompanying drawing the tractor wheel 1 is of usual pattern and is provided with a relatively broad tread or rim 2. The stalk cutter and soil pulverizer includes a series of angle bars 3 applied to the tread 2 of the wheel 1 at intervals and disposed transversely across the same. The end portions of the bars 3 project, slightly, beyond the side edges of the tread 2. Bolts 4 are provided for securing the bars 3 in position upon the treads and the said bolts pass transversely through the bars and the treads and are secured by means of nuts in a usual manner. Blades 5 are secured by means of bolts 6 to the outstanding portions of the bars 3 and the inner edges of the blades 5 bear against the periphery of the tread 2. The blades 5 are provided at their outer edges with cutting edges 7. The blades 5 at their end portions project slightly beyond the side edges of the tread 2 of the wheel.

It is obvious that the wheels 1 at the opposite sides of the tractor machine may be equipped with the bars and blades and consequently the combined stalk cutter and soil pulverizer may operate upon two rows of stalks simultaneously.

When the tractor wheel is equipped with the stalk cutter as described and as the wheel passes over a row of stalks, the wheel engages the stalks and breaks them down. By reason of the fact that the wheel possesses a relatively broad tread 2 the stalks will be encountered even though they are positioned slightly out of the line of the row of stalks. The cutting edges 7 of the blades 5 come in contact with the prostrate stalks and sever them into sections. At the same time the cutting edges 7 of the blade 5 enter the soil, break up the clods, if any, and make incisions in the soil and simultaneously therewith the weight of the wheel 1 and the parts supported thereby is applied downwardly upon the soil in which the incisions are made and as the blades 5 are withdrawn from the soil during the rotation of the wheel the soil is broken down at the sides of the incisions and is pulverized, and is placed in a condition to be operated upon to advantage by trailing implement or machine which is hitched to the tractor of which the wheel 1 is a partial support.

The above description taken in conjunction with the accompanying drawing it will be seen that a combined stalk cutter and soil pulverizer of simple structure is provided and that the same may be used to advantage for simultaneously reducing stalks into sections and pulverizing the soil preparatory for planting or other purposes.

Having described the invention what is claimed is:

1. A combined stalk cutter, soil pulverizer and tractor wheel, comprising a wheel having a relatively broad rim, angle bars secured to the tread of the rim by one of their wings and having the other wing projecting outwardly, opposite end portions of the bars projecting beyond the edges of the rim, and blades secured to the outwardly extending wings and projecting beyond the outer edges thereof.

2. A combined stalk cutter, soil pulverizer and tractor wheel, comprising a wheel having a relatively broad rim, angle bars secured to the tread of the rim by one of their wings and having the other wing projecting outwardly, opposite end portions of the bars projecting beyond the edges of the rim, and blades coextensive with the angle bars and secured to the outwardly extending wings and projecting beyond the outer edges thereof, and having their inner edges in contact with the said rim.

In testimony whereof I affix my signature in presence of two witnesses.

AMON HOBSON

Witnesses:
J. B. INGRAM,
B. F. BOOTH.